(12) United States Patent
Darweesh et al.

(10) Patent No.: US 7,383,537 B2
(45) Date of Patent: Jun. 3, 2008

(54) DEBUGGING AN APPLICATION THAT EMPLOYS RIGHTS-MANAGED CONTENT

(75) Inventors: Michael Joseph Darweesh, Redmond, WA (US); Michael David Marr, Sammamish, WA (US); Octavian Tony Ureche, Redmond, WA (US); Philip LaFornara, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/644,359

(22) Filed: Aug. 20, 2003

(65) Prior Publication Data

US 2005/0044534 A1  Feb. 24, 2005

(51) Int. Cl.
*G06F 9/44* (2006.01)

(52) U.S. Cl. ............................... 717/127; 717/124
(58) Field of Classification Search ................ 717/124, 717/127
See application file for complete search history.

(56) References Cited

U.S. PATENT DOCUMENTS

| | | | | |
|---|---|---|---|---|
| 5,715,403 | A |  | 2/1998 | Stefik ........................ 395/244 |
| 6,256,774 | B1 | * | 7/2001 | O'Leary et al. ............ 717/120 |
| 6,324,683 | B1 | * | 11/2001 | Fuh et al. ................... 717/124 |
| 2005/0028151 | A1 | * | 2/2005 | Roth et al. .................. 717/162 |

FOREIGN PATENT DOCUMENTS

| | | |
|---|---|---|
| WO | WO 00/58811 | 10/2000 |
| WO | WO 00/59150 | 10/2000 |
| WO | WO 01/52021 A1 | 7/2001 |

OTHER PUBLICATIONS

Hong, S. et al., "On the construction of a powerful distributed authentication server without additional key management", *Computer Communications*, 2000, 23, 1638-1644.

Managing Digital Rights in Online Publishing, "How two publishing houses maintin control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

(Continued)

*Primary Examiner*—Tuan Dam
*Assistant Examiner*—Andrew Y Chou
(74) *Attorney, Agent, or Firm*—Woodcock Washburn LLP (57) ABSTRACT

A system debugs a computer application that employs rights-managed (RM) content. A first, non-isolated process has the application and a shell version of the trusted component, where such shell version receives each request by the application for RM services. The shell version is unconcerned whether a debugger is monitoring the first process. A second, isolated process is separate from the first process and has a debugging version of the trusted component. The shell version in the first process forwards the received request to the debugging version in the second process, and such debugging version acts upon same. The debugging version ensures that the debugger is not monitoring the second process, but is unconcerned whether the debugger is monitoring the first process.

23 Claims, 5 Drawing Sheets

OTHER PUBLICATIONS

Zwollo, K. "Digital document delivery and digital rights management", *Information Services & Use*, 2001, 9-11.

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

Evans, P. "DRM: Is the Road to Adoption Fraught with Potholes?" *Seybold Reporting Analyzing Publishing Technologies*, 2001, 1(14), 32.

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Gunter, C.A., et al. "Models and Languages for Digital Rights", *Proceedings of the 34th Annual Hawaii International Conference on System Sciences*, 2001, 1-5.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

\* cited by examiner

DEBUGGING AN APPLICATION THAT EMPLOYS RIGHTS-MANAGED CONTENT

CROSS-REFERENCE TO RELATED APPLICATIONS

The following U.S. patent applications disclose subject matter that is related to the subject matter of the present application, and are hereby incorporated herein by reference in their entirety:

U.S. patent application Ser. No. 10/185,527, filed Jun. 28, 2002, entitled "Obtaining a Signed Rights Label (SRL) for Digital Content and Obtaining a Digital License Corresponding to the Content Based on the SRL in a Digital Rights Management System";

U.S. patent application Ser. No. 10/185,278, filed Jun. 28, 2002, entitled "Using a Rights Template to Obtain a Signed Rights Label (SRL) for Digital Content in a Digital Rights Management System";

U.S. patent application Ser. No. 10/185,511, filed Jun. 28, 2002, entitled "Systems And Methods For Issuing Usage Licenses For Digital Content And Services";

U.S. patent application Ser. No. 10/364,627, filed Feb. 11, 2003, entitled "Publishing Digital Content Within an Organization in Accordance with a Digital Rights Management (RM) System"; and U.S. patent application Ser. No. 10/364,115, filed Feb. 11, 2003, entitled "Publishing Digital Content Within an Organization in Accordance with a Digital Rights Management (RM) System".

TECHNICAL FIELD

This invention relates to a rights management system for managing rights in digital content. More particularly, the invention relates to an application that employs rights-managed content, and specifically a method and mechanism for debugging such application.

BACKGROUND OF THE INVENTION

Rights management (RM) and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders the digital content with the aid of appropriate rendering software such as an audio player, a text displayer, etc. on a personal computer or other hardware.

In one scenario, a content owner or rights-owner such as an author, a publisher, a broadcaster, etc., wishes to distribute such digital content to each of many users or recipients in exchange for a license fee or some other consideration. In such scenario, then, the content may be an audio recording, a multimedia presentation, etc., and the purpose of the distribution is to generate the license fee. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be rendered only a limited number of times, only for a certain total time, only on a certain type of machine, only on a certain type of rendering platform, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

RM and enforcement architectures and methods have thus been provided to allow the controlled rendering of arbitrary forms of digital content, where such control is flexible and definable by the content owner/developer of such digital content. Examples of such architectures are set forth in the related applications set forth above, among, others. Such architectures allow and facilitate such controlled rendering, especially in an office or organization environment or the like where documents are to be shared amongst a defined group of individuals or classes of individuals.

As may be appreciated, central to any RM architecture is one or more applications that produce, consume, or otherwise employ (hereinafter 'employ') rights managed (RM) content. For example, if the RM content is a word processing document, such document may be created by a first word processing application and/or may be consumed by such first word processing application or a second word processing application. Likewise, if the RM content is a multimedia presentation, such presentation may be created by a first presentation application and/or may be consumed by such first presentation application or a second present application.

Each application that employs RM content typically includes or has local access to a RM module or the like, where the RM module performs RM functions on behalf of the application. Typically, the RM functions performed by the RM module include both functions necessary to deal with RM content and functions necessary to ensure that the application and the environment surrounding the application can be trusted to properly handle the RM content.

In the latter case in particular, the RM module may include functionality necessary to ensure that the application is not being monitored by an external element in an attempt to obtain RM content in an unprotected or 'naked' form. Alternatively, the application may be running on a computer as an isolated process to ensure that the application is not being monitored by such an external element. In either case, such external element may be any of several devices, but it has become apparent that a debugger may be employed by a nefarious entity as such an external element.

As should be appreciated, a debugger is a software and/or hardware device that may be set up in connection with an application during development and/or operation thereof, primarily to assist in identifying and solving problems associated with such application. Thus, the debugger includes functionality to monitor an application, to step through the application, to set or alter breakpoints associated with the application, to modify aspects of the application, and the like. Perhaps most significantly, such a debugger can read memory associated with an application, such as memory with the naked content. A nefarious entity employing such a debugger, then, can copy the naked content from the memory without any of the RM protection associated therewith.

An application that employs RM content, then, should not normally be allowed have access to such RM content if a debugger or other external element is monitoring the application. Otherwise, and as set forth above, the debugger can be employed to copy the RM content in a naked form. Accordingly, the RM module typically attempts to detect any such debugger, and if such a debugger is detected the RM module takes appropriate action such as shutting down the application and/or refusing to allow the application to have access to RM content.

An issue arises, however, in that certain instances exist wherein a debugger nevertheless should be allowed to monitor an application that has access to RM content. Most prominently, such certain instances include the instance where the developer of the application is in fact developing and/or debugging the application and as part of such development/debugging legitimately requires use of a debugger. Of course, other similar instances exist. As should be appreciated, though, despite the legitimate need for using a debugger with the application, the RM module associated with the application upon detecting such debugger will take the aforementioned appropriate action and thereby in fact prevent the legitimately debugging application from having access to RM content.

A need exists, then, for a method and mechanism that allows use of a debugger with an application that employs RM content. In particular, a need exists for such a method and mechanism whereby a developer of the application or the like with a legitimate need can debug the application. Even more particularly, a need exists for such a method and mechanism whereby such developer or the like can run the application with the RM module, where the RM module is part of an isolated process but the application is not part of an isolated process. As such a debugger can monitor the application but not the RM module.

SUMMARY OF THE INVENTION

The aforementioned needs are satisfied at least in part by the present invention in which a system debugs a computer application that employs rights-managed (RM) content, where the application is normally instantiated in an isolated process with a trusted component for performing RM services for the application including ensuring that a debugger is not monitoring the isolated process. In the system, a first, non-isolated process has the application and a shell version of the trusted component, where such shell version of the trusted component receives each request by the application for RM services. The first process is monitored by the debugger and the shell version of the trusted component in the first process is unconcerned whether the debugger is monitoring the first process.

A second, isolated process is separate from the first process and has a debugging version of the trusted component. The shell version of the trusted component in the first process forwards the received request to the debugging version of the trusted component in the second process, and such debugging version of the trusted component in the second process acts upon the request from the application in the first process. The debugging version of the trusted component in the second process ensures that the debugger is not monitoring the second process, but is unconcerned whether the debugger is monitoring the first process. Accordingly, the debugger may monitor the application and the first process even as the application and first process are employing the RM content.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
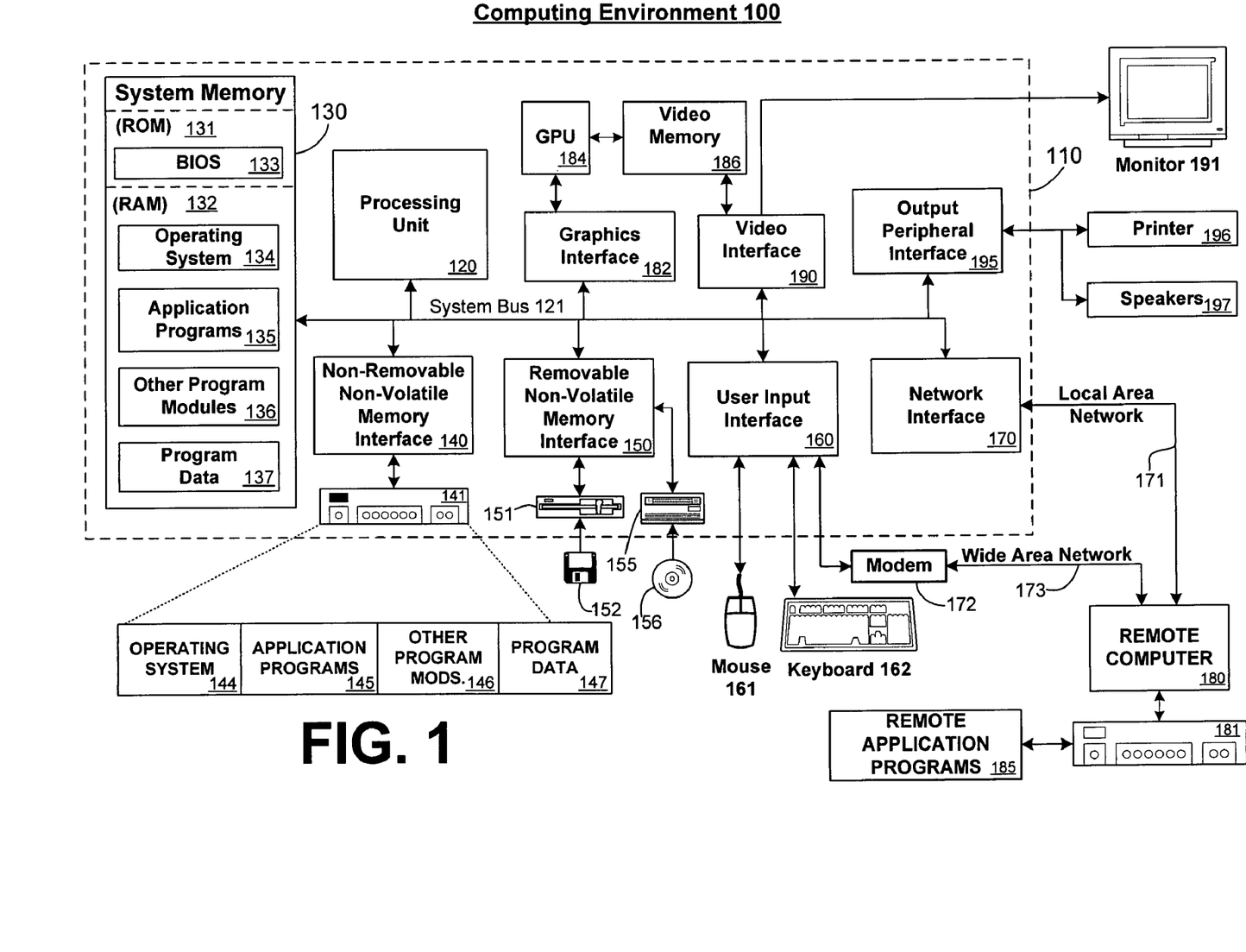
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
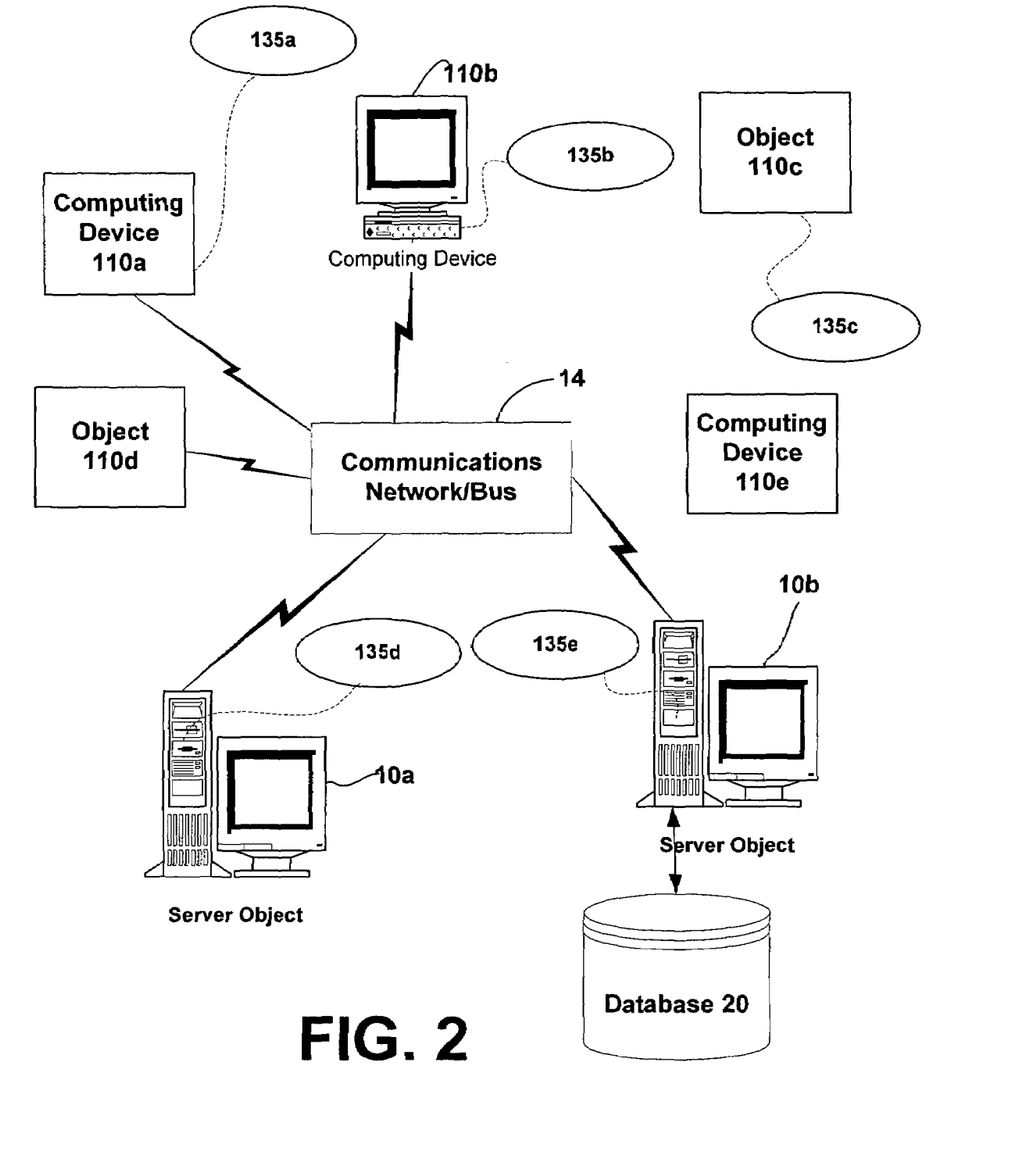
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 3:
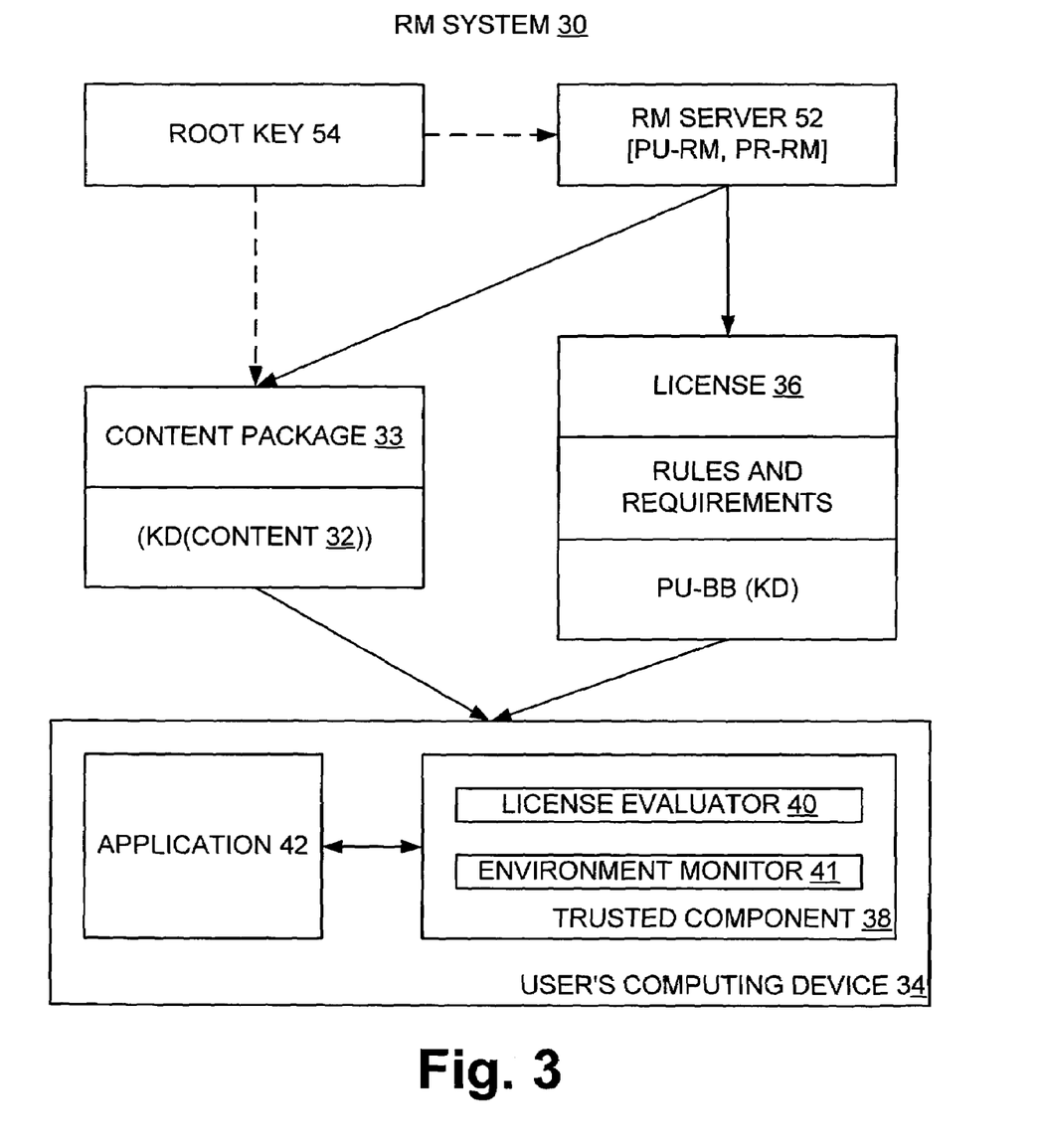
FIG. 3 is a block diagram showing an enforcement architecture of an example of a trust-based system.

As is known, and referring now to FIG. 3, rights management (RM) and enforcement is highly desirable in connection with digital content 32 such as digital audio, digital video, digital text, digital data, digital multimedia, etc., where such digital content 32 is to be distributed to users. Upon being received by the user, such user renders the digital content with the aid of an appropriate rendering device such as a media player, text displayer, etc. on a personal computer 34 or the like.

Typically, a content owner or developer (hereinafter 'owner') distributing such digital content 32 wishes to restrict what the user can do with such distributed digital content 32. For example, the content owner may wish to restrict the user from copying and re-distributing such content 32 to a second user, or may wish to allow distributed digital content 32 to be rendered only a limited number of times, only for a certain total time, only on a certain type of machine, only on a certain type of rendering platform, only by a certain type of user, etc.

However, after distribution has occurred, such content owner has very little if any control over the digital content 32. An RM system 30, then, allows the controlled rendering of arbitrary forms of digital content 32, where such control is flexible and definable by the content owner of such digital content. Typically, content 32 is distributed to the user in the form of a package 33 by way of any appropriate distribution channel. The digital content package 33 as distributed may include the digital content 32 encrypted with a symmetric encryption/decryption key (KD), (i.e., (KD(CONTENT))), as well as other information identifying the content, how to acquire a license for such content, etc.

The trust-based RM system 30 allows an owner of digital content 32 to specify license rules that must be satisfied before such digital content 32 is allowed to be rendered on a user's computing device 34. Such license rules can include the aforementioned temporal requirement, and may be embodied within a digital license or use document (hereinafter 'license') 36 that the user/user's computing device 34 (hereinafter, such terms are interchangeable unless circumstances require otherwise) must obtain from the content owner or an agent thereof. Such license 36 also includes the decryption key (KD) for decrypting the digital content, perhaps encrypted according to a key decryptable by the user's computing device 34. As seen in FIG. 3, such encrypting key is a public key of the user's computing device 34 (PU-BB), and the user's computing device 34 presumably has the corresponding private key (PR-BB) by which (PU-BB(KD)) may be decrypted.

The content owner for a piece of digital content 32 must trust that the user's computing device 34 will abide by the rules and requirements specified by such content owner in the license 36, i.e. that the digital content 32 will not be rendered unless the rules and requirements within the license 36 are satisfied. Preferably, then, the user's computing device 34 is provided with a trusted component or mechanism 38 that will not render the digital content 32 except according to the license rules embodied in the license 36 associated with the digital content 32 and obtained by the user, and will not render the digital content 32 unless it is determined that the computing device 34 and rendering device/application can be trusted to not reveal the digital content 32 in a naked form.

The trusted component 38 typically has a license evaluator 40 that determines whether the license 36 is valid, reviews the license rules and requirements in such valid license 36, and determines based on the reviewed license rules and requirements whether the requesting user has the right to render the requested digital content 32 in the manner sought, among other things. As should be understood, the license evaluator 40 is trusted in the RM system 30 to carry out the wishes of the owner of the digital content 32 according to the rules and requirements in the license 36, and the user should not be able to easily alter such trusted element for any purpose, nefarious or otherwise.

As should be understood, the rules and requirements in the license 36 can specify whether the user has rights to render the digital content 32 based on any of several factors, including who the user is, where the user is located, what type of computing device the user is using, what rendering application is calling the RM system, the date, the time, etc. In addition, the rules and requirements of the license 36 may limit the license 36 to a pre-determined number of renderings, or pre-determined rendering time, for example. Thus, the trusted component 38 may need to refer to a clock 42 on the computing device 34.

The rules and requirements may be specified in the license 36 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

The trusted component 38 typically has an environment monitor 41 that determines whether the computing device 34 and rendering device/application can be trusted to not reveal the digital content 32 in a naked form. The environment monitor 41 thus ensures that no external element such as a debugger is monitoring the application, and the like before allowing the content 32 to be rendered. Methods and mechanisms for doing so are known or should be apparent to the relevant public and therefore need not be set forth herein in any detail.

Upon the license evaluator 40 determining that the license 36 is valid and that the user satisfies the rules and requirements therein, and upon the environment monitor 41 determining that the application is operating in a trusted environment, the digital content 32 can then be rendered. In particular, to render the content 32, the decryption key (KD) is obtained from the license 36 and is applied to (KD (CONTENT)) from the content package 33 to result in the actual content 32, and the actual content 32 is then in fact rendered.

Debugging an Application that Employs Rights-Managed Content by Proxy

As was set forth above, and still referring to FIG. 3, an application 42 that employs RM content 32 typically includes or has local access to an RM module or the like such as the trusted component 38 or an agent thereof (hereinafter 'trusted component'), where the trusted component 38 performs RM functions in connection with the application 42 including license evaluation by way of the license evaluator 40 and environment monitoring by way of the environment monitor 41. As seen, the application 42 and the trusted component 38 reside within a single process 44, where the application 42 is or includes an executable such as a .exe element, and the trusted component 38 is or includes a library such as a .dll element that is accessible to the executable corresponding to the application 42.

Thus, the trusted component 38 by way of the environment monitor 41 thereof ensures that the application 42 and process 44 thereof is not being monitored by an external element such as a debugger 46, among other things. As a result, a nefarious entity cannot for example employ such a debugger 46 to copy naked content 32 from memory associated with the application 42 and process 44 without any of the RM protection associated therewith. Methods and mechanisms employed by the trusted component 38 and the environment monitor 41 thereof are known or should be apparent to the relevant public and therefore need not be set forth herein in any detail.

As was pointed out above, though, the debugger 46 nevertheless should be allowed to monitor the application 42 and process 44 such as for example when the application 42/process 44 is in fact being developed/debugged by a legitimate developer. However, such legitimate developer is not able to operatively couple the debugger 46 to the application 42/process 44 of FIG. 4 for the reason that the environment monitor 41 and trusted component 38 of such process 44 upon sensing such debugger 46 will prevent the legitimately debugging application 42 from having access to RM content 32.

Figure 4:
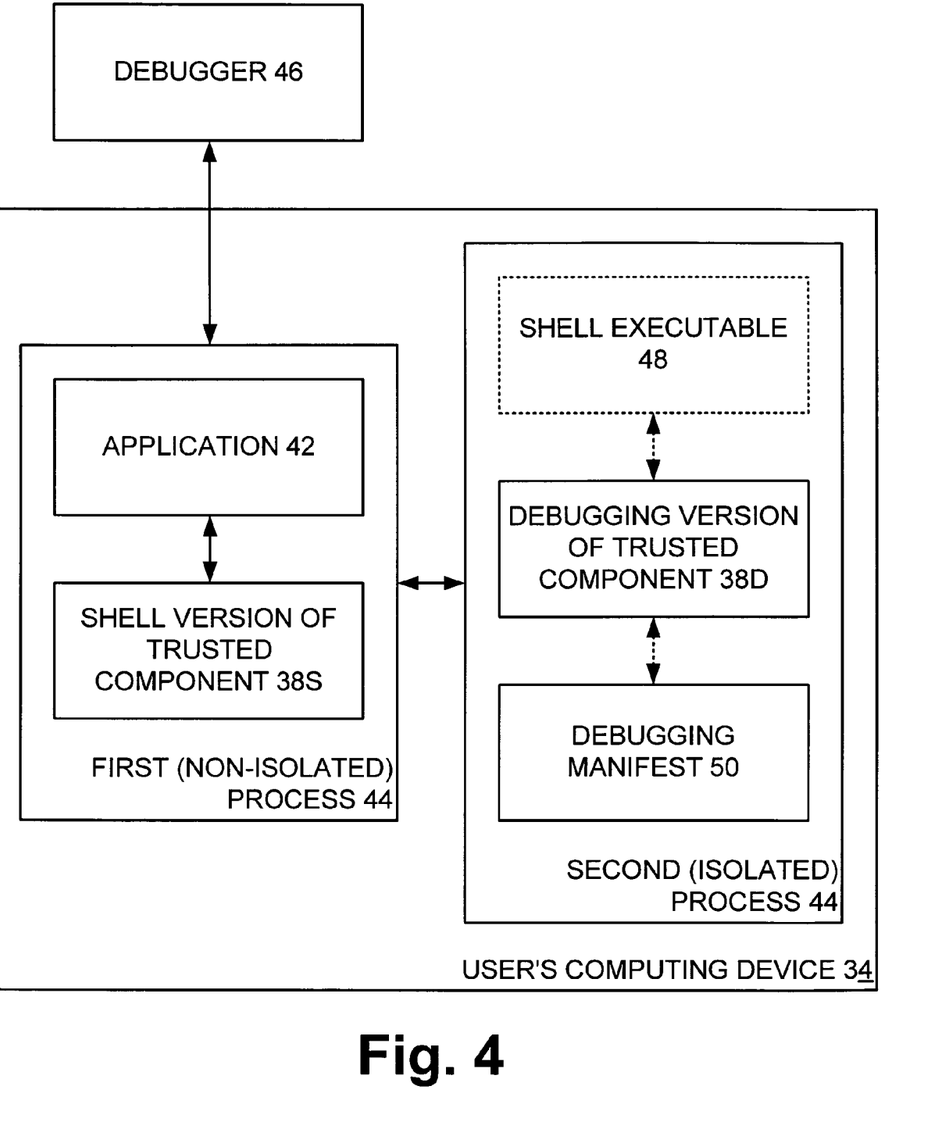
FIG. 4 is a block diagram showing a debugging structure for debugging an application that employs rights-managed content 3 in accordance with one embodiment of the present invention.

Accordingly, and turning now to FIG. 4, and in one embodiment of the present invention, for purposes of debugging the application 42, a legitimate developer thereof or the like is provided with a debugging version of the trusted component 38d that is run in a process 44 separate from the application 42 and with a shell version of the trusted component 38s that is run in the process 44 of the application 42. In particular, and as is seen in FIG. 4, in the present invention, the application 42 being debugged is run in a first process 44 with the shell version of the trusted component 38s, and the debugging version of the trusted component 38d is run in a second process 44 separate from the first process 44. Thus, each request by the application 42 for RM services is directed to the shell version of the trusted component 38s.

Notably, in the present invention, the shell version of the trusted component 38s acts as a dummy element for receiving the request from the application 42, and such shell version of the trusted component 38s in fact principally functions to forward the received request to the debugging version of the trusted component 38d running in the second process 44. As may now be appreciated, the debugging version of the trusted component 38d in the second process 44 acts upon the request that originated from the application 42 in the first process 44, and based on the acted-upon request returns appropriate data, if any, back to the application 42 in the first process 44 by way of the shell version of the trusted component 38s in such first process 44. Accordingly, from the point of view of the application 42 in the first process 44, the request to the shell version of the trusted component 38s in the first process 44 is responded to by such shell version of the trusted component 38s in the first process 44.

More significantly, because the debugging version of the trusted component 38d is in the second process 44, such second process 44 is isolated. Thus, the debugging version of the trusted component 38d ensures that no debugger 46 is monitoring the isolated second process 44, and is entirely unconcerned whether any debugger 46 is monitoring the first process 44 and the application 42 therein. Further, and in one embodiment of the present invention, the first process 44 is not isolated, and the shell version of the trusted component 38s in the first process 44 does not include any functionality for ensuring that no debugger 46 is monitoring the first process 44. Therefore, the shell version of the trusted component 38s is also entirely unconcerned whether any debugger 46 is monitoring the non-isolated first process 44 and the application 42 therein. As a result, a debugger 46 may be operatively coupled to the application 42 and the non-isolated first process 44 to monitor same even as the application 42 and first process 44 are employing RM content 32.

Figure 5:
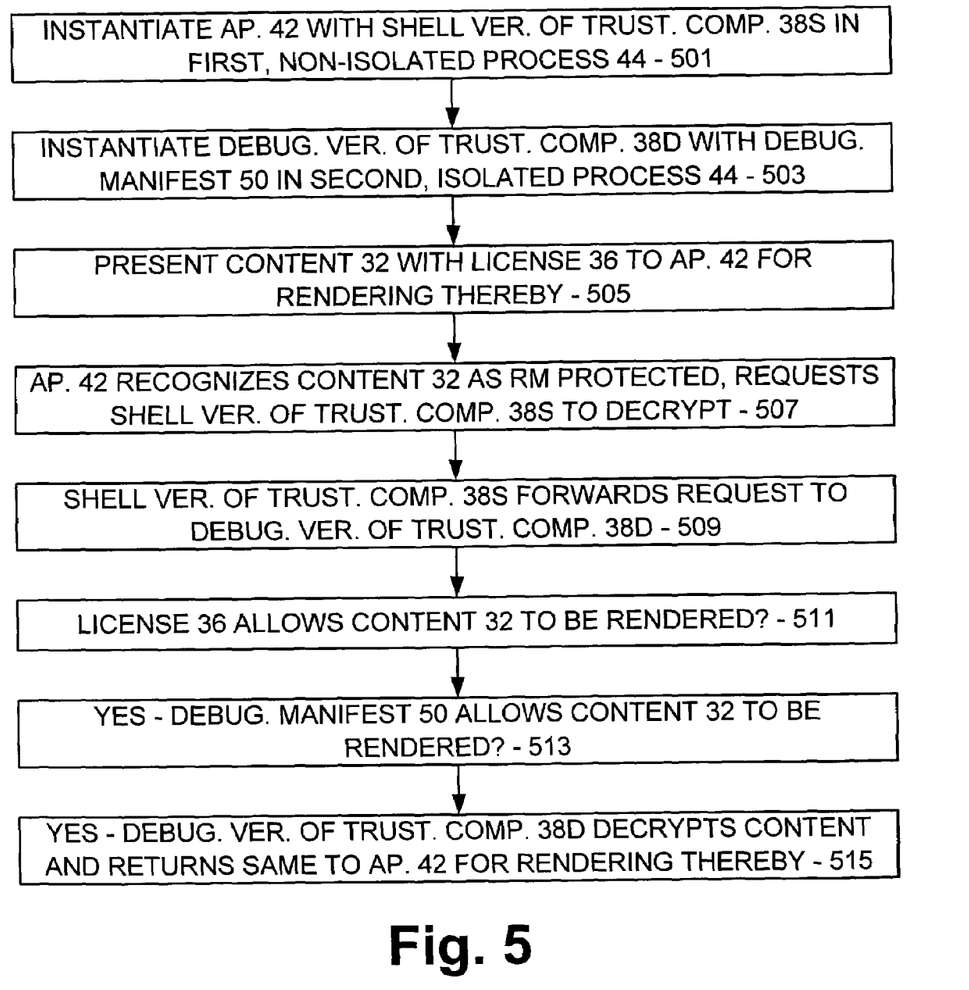
FIG. 5 is a flow diagram showing key steps performed by the debugging structure of FIG. 4 in accordance with one embodiment of the present invention.

As may be appreciated, in at least some instances each process 44 requires an operating executable such as a .exe element. In instances where the debugging version of the trusted component 38d is in the nature of a library such as a .dll element, then, it is necessary to include in the second process 44 with the debugging version of the trusted component 38d a shell executable 48, as is seen in FIG. 5. Of course, such shell executable 48 is not required in the present invention in instances where each process 44 does not require an operating executable.

The shell executable 48 in the second process 44 principally functions as the necessary operating executable in situations where such executable is necessary in connection with the second process 44, and such shell executable 48 need not necessarily perform any actual functionality in connection with the present invention. Note, though, that in forwarding the received request to the debugging version of the trusted component 38d running in the second process 44, as was set forth above, the shell version of the trusted component 38s may in actuality forward the received request to the shell executable 48 in the second process 44 and such shell executable 48 in turn further forwards the received request to the debugging version of the trusted component 38d running in the second process 44. Likewise, the debugging version of the trusted component 38d in the second process 44 after acting upon the request may return appropriate data, if any, back to the application 42 in the first process 44 by way of the shell executable 48 in the second process 44 and the shell version of the trusted component 38s in the first process 44.

As should now be appreciated, the debugging version of the trusted component 38d in the isolated second process 44 only ensures that no debugger 46 is monitoring the shell executable 48 and the second process 44, and is entirely unconcerned whether any debugger 46 is monitoring the first process 44 and the application 42 therein. Again, the shell version of the trusted component 38s in the first process 44 does not include any functionality for ensuring that no debugger 46 is monitoring the non-isolated first process 44, and is therefore also entirely unconcerned whether any debugger 46 is monitoring the first process 44 and the application 42 therein. As a result, a debugger 46 may be operatively coupled to the application 42 and the non-isolated first process 44 to monitor same even as the application 42 and first process 44 are employing RM content 32.

Note that the shell version of the trusted component 38s, debugging version of the trusted component 38d, and the shell executable 48 should only be distributed to those with a legitimate need for debugging an associated application 42. Otherwise, if such items were distributed widely, it is more likely that a nefarious entity could obtain and potentially employ such items to subvert RM protection with respect to one or more pieces of RM content 32.

Inasmuch as only legitimate users should be provided with such items, it may be advisable to require each legitimate user to agree to use the items only for appropriate purposes, and to agree not to re-distribute the items to other users such as for example the aforementioned nefarious entity. In one embodiment of the present invention, each set of items as provided to a legitimate user is marked with an identifier identifying the legitimate user, where the identifier travels with the items and also with content 32 and/or licenses 36 obtained according to the items. Such identifier may for example comprise a public key by which content 32 is bound to the items, although other items may also be employed without departing from the spirit and scope of the present invention. Accordingly, if the legitimate user somehow re-distributes the items to a nefarious entity, it may be possible to trace back use of the items by the nefarious entity to the legitimate user, and based thereon to take an appropriate action against the legitimate user.

In one embodiment of the present invention, and in an attempt to thwart a potential nefarious entity in possession of the shell version of the trusted component 38s, the debugging version of the trusted component 38d, and the shell executable 48, a debugging manifest 50 is provided along with the debugging version of the trusted component 38d and the shell executable 48 of the second process 44. In the embodiment, the debugging version of the trusted component 38d during operation thereof must refer to the debugging manifest 50 for information therein, and the information in the debugging manifest 50 is only relevant to the second process 44 including the debugging version of the trusted component 38d and the shell executable 48, and not to any other process 44 such as the first process 44.

As may be appreciated, the information in the debugging manifest 50 may include items such as a description of the environment inside the second process 44, a digital signature with a verifying certificate chain, keys that can be employed to verify constituent elements of the second process 44, and the like. In operation, then, the debugging version of the trusted component 38d must refer to the debugging manifest 50 for example to obtain a key to verify the shell executable 48, or to determine that the environment of the second process 44 should in fact include the shell executable 48, or to obtain certain procedures that must be followed in the course of operation, or the like. Note that the debugging version of the trusted component 38d may refer to the debugging manifest 50 in any appropriate manner without departing from the spirit and scope of the present invention.

With the debugging manifest 50, then, and in one embodiment of the present invention, the debugging manifest restricts the debugging version of the trusted component 38d to 'debug' content 32 only. Thus, a nefarious entity cannot employ the debugging manifest 50 to employ any other 'normal' content 32. As may be appreciated, such debug content 32 may be designated as such and may be recognized by way of the debugging manifest 50 in any appropriate manner without departing from the spirit and scope of the present invention.

For one example, the debug content 32 may include therewith a signature from a debug RM server 52 (FIG. 3) or may have a corresponding license 36 with a signature from such a debug RM server 52. In such situation, the debugging manifest 50 may specify that content 32 may only be rendered if such content 32 includes therewith the signature from the debug RM server 52 or has the corresponding license 36 with the signature from such debug RM server 52. Accordingly, content 32 with a signature from another RM server 52 or with a corresponding license 36 with a signature from another RM server 52, such as content 32 that would have some value to a nefarious entity in a naked form, cannot be rendered in conjunction with such debugging manifest 50.

For another example, and remembering that for purposes of verification a signature may include therewith a certificate chain back to a root key, the debug content 32 may include therewith a signature that derives from a debug root key 54 (FIG. 3) or may have a corresponding license 36 with a signature that derives from such a debug root key 54. In such situation, the debugging manifest 50 may specify that content 32 may only be rendered if such content 32 includes therewith a signature that derives from the debug root key 54 or has the corresponding license 36 with the signature that derives from such debug root key 54. Accordingly, content 32 with a signature that derives from another root key or with a corresponding license 36 with a signature that derives from another root key, such as the aforementioned content 32 that would have some value to a nefarious entity in a naked form, cannot be rendered in conjunction with such debugging manifest 50.

In operation, then, and referring now to FIG. 5, the arrangement shown in FIG. 4 is operated in the following manner during debugging of the application 42.

Preliminarily, the application 42 is instantiated with the shell version of the trusted component 38s in the first, non-isolated process 44 (step 501) and the debugging version of the trusted component 38d is instantiated with the debugging manifest 50 and perhaps with the shell executable 48 in the second, isolated process 44 (step 503). Thus, and again, the debugger 46 may monitor the first, non-isolated process 44 but not the second, isolated process 44, as is shown in FIG. 4.

Thereafter, content 32 with a license 36 is presented to the application 42 for rendering thereby (step 505). Here, the application 42 recognizes that the content 32 is RM protected and therefore requests the shell version of the trusted component 38s to assist in decrypting and rendering the content 32 (step 507). Since, the shell version of the trusted component 38s in the first process 44 is in fact merely a shell, such component 38s then forwards the request to the debugging version of the trusted component 38d in the second process 44, perhaps by way of the shell executable 48 (step 509).

The debugging version of the trusted component 38d then evaluates the license 36 corresponding to the content 32 to satisfy itself that the content 32 is allowed to be rendered based on such license 36 (step 511). In addition, the debugging version of the trusted component 38d reviews the debugging manifest 50 to satisfy itself that the content 32 is allowed to be rendered based on such manifest 50 (step 513). Presuming, then, that both the license 36 and the manifest 50 allow the content 32 to be rendered, the debugging version of the trusted component 38d decrypts such content 32 and returns same to the application 42 for rendering thereby (step 515).

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism are provided that allow use of a debugger 46 with an application 42 that employs RM content 32. Thus, a developer of the application 42 or the like with a legitimate need can debug the application 42. In the invention, the application 44 is not part of an isolated process 44 but the debugging version of the trusted component 38d is part of an isolated process 44. As such the debugger 46 can monitor the application 42 but not the debugging version of the trusted component 38d.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A system for debugging a computer application that employs rights-managed (RM) content, the application normally being instantiated in an isolated process with a trusted component for performing RM services for the application including ensuring that a debugger is not monitoring the isolated process, the system comprising:

a first, non-isolated process having the application and a shell version of the trusted component, such shell version of the trusted component receiving each request by the application for RM services, the first process for being monitored by the debugger and the shell version of the trusted component in the first process being unconcerned whether the debugger is monitoring the first process; and a second, isolated process separate from the first process and having a debugging version of the trusted component, the shell version of the trusted component in the first process forwarding the received request to the debugging version of the trusted component in the second process, such debugging version of the trusted component in the second process acting upon the request from the application in the first process, the debugging version of the trusted component in the second process also ensuring that the debugger is not monitoring the second process, the debugging version of the trusted component in the second process being unconcerned whether the debugger is monitoring the first process, whereby the debugger may monitor the application and the first process even as the application and first process are employing the RM content.

2. The system of claim 1 wherein the debugging version of the trusted component in the second process based on the acted-upon request returns appropriate data, if any, back to the application in the first process by way of the shell version of the trusted component in such first process.

3. The system of claim 1 further comprising the debugger monitoring the first process and the application thereof.

4. The system of claim 1 wherein the application in the first process includes an executable and the debugging version of the trusted component in the second process includes a library of services available to the executable corresponding to the application.

5. The system of claim 1 wherein the debugging version of the trusted component in the second process is a library and the second process requires an executable, and wherein the second process further has a shell executable.

6. The system of claim 5 wherein the shell executable includes no substantial functionality.

7. The system of claim 1 wherein the shell version of the trusted component in the first process includes no substantial functionality.

8. The system of claim 1 further comprising a debugging manifest corresponding to the debugging version of the trusted component in the second process, the debugging manifest including information therein relevant to the debugging version of the trusted component and the second process, the debugging version of the trusted component during operation thereof referring to the debugging manifest for the information therein.

9. The system of claim 8 wherein the information in the debugging manifest is selected from a group consisting of a description of an environment of the second process, a digital signature with a verifying certificate chain, keys that are to be employed to verify constituent elements of the second process, procedures to be followed by the debugging version of the trusted component, and combinations thereof.

10. The system of claim 8 wherein the information in the debugging manifest restricts the debugging version of the trusted component in the second process to allowing the application to employ debug RM content only and not normal RM content.

11. The system of claim 10 wherein debug RM content has a digital signature associated therewith from a debug RM server and normal RM content does not have such a digital signature associated therewith from a debug RM server.

12. The system of claim 10 wherein debug RM content has a digital signature associated therewith that derives from a debug root key and normal RM content does not have such a digital signature associated therewith that derives from a debug root key.

13. A method for debugging a computer application that employs rights-managed (RM) content, the application normally being instantiated in an isolated process with a trusted component for performing RM services for the application including ensuring that a debugger is not monitoring the isolated process, the method comprising:

the application and a shell version of the trusted component being instantiated in a first, non-isolated process, the first process for being monitored by the debugger and the shell version of the trusted component in the first process being unconcerned whether the debugger is monitoring the first process;

a debugging version of the trusted component being instantiated in a second, isolated process, the debugging version of the trusted component in the second process ensuring that the debugger is not monitoring the second process, the debugging version of the trusted component in the second process being unconcerned whether the debugger is monitoring the first process, the application in the first process receiving a request to render RM content and in turn requesting the shell version of the trusted component to assist in decrypting and rendering the content;

the shell version of the trusted component in the first process forwarding the request to the debugging version of the trusted component in the second process;

the debugging version of the trusted component in the second process determining that the RM content is allowed to be rendered; and the debugging version of the trusted component in the second process decrypting the RM content and returning same to the application in the first process for rendering thereby, whereby the debugger may monitor the application and the first process even as the application and first process are employing the RM content.

14. The method of claim 13 wherein the debugging version of the trusted component in the second process determining that the RM content is allowed to be rendered comprises the debugging version of the trusted component determining that the RM content is allowed to be rendered based on a license corresponding thereto.

15. The method of claim 13 wherein the debugging version of the trusted component and a debugging manifest corresponding to the debugging version of the trusted component are instantiated in the second, isolated process, the debugging manifest including information therein relevant to the debugging version of the trusted component and the second process, and wherein the debugging version of the trusted component in the second process determining that the RM content is allowed to be rendered comprises the debugging version of the trusted component determining that the RM content is allowed to be rendered based on the information in the debugging manifest.

16. The method of claim 15 wherein the information in the debugging manifest restricts the debugging version of the trusted component in the second process to allowing the application to employ debug RM content only and not normal RM content.

17. The method of claim 16 wherein debug RM content has a digital signature associated therewith from a debug RM server and normal RM content does not have such a digital signature associated therewith from a debug RM server.

18. The method of claim 16 wherein debug RM content has a digital signature associated therewith that derives from a debug root key and normal RM content does not have such a digital signature associated therewith that derives from a debug root key.

19. The method of claim 13 wherein the debugging version of the trusted component in the second process returns the decrypted RM content to the application in the first process by way of the shell version of the trusted component in such first process.

20. The method of claim 13 further comprising the debugger monitoring the first process and the application thereof.

21. The method of claim 13 wherein the debugging version of the trusted component in the second process is a library and the second process requires an executable, and wherein the debugging version of the trusted component and a shell executable are instantiated in the second, isolated process.

22. The method of claim 21 comprising instantiating the shell executable with no substantial functionality.

23. The method of claim 13 comprising instantiating the shell version of the trusted component in the first process with no substantial functionality.

* * * * *